(12) United States Patent
Bai et al.

(10) Patent No.: US 11,602,843 B2
(45) Date of Patent: Mar. 14, 2023

(54) FOOT-WAIST COORDINATED GAIT PLANNING METHOD AND APPARATUS AND ROBOT USING THE SAME

(71) Applicant: UBTECH ROBOTICS CORP LTD, Shenzhen (CN)

(72) Inventors: Jie Bai, Shenzhen (CN); Ligang Ge, Shenzhen (CN); Yizhang Liu, Shenzhen (CN); Hongge Wang, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 336 days.

(21) Appl. No.: 16/932,872

(22) Filed: Jul. 20, 2020

(65) Prior Publication Data
US 2021/0162595 A1 Jun. 3, 2021

(30) Foreign Application Priority Data
Nov. 28, 2019 (CN) .......................... 201911188547.8

(51) Int. Cl.
*B25J 9/16* (2006.01)
*B25J 5/00* (2006.01)

(52) U.S. Cl.
CPC ............... *B25J 9/1633* (2013.01); *B25J 5/00* (2013.01); *B25J 9/162* (2013.01); *B25J 9/1664* (2013.01)

(58) Field of Classification Search
CPC ........ B25J 9/1633; B25J 9/162; B25J 9/1664; B25J 5/00; B25J 9/1697; B25J 9/163;
(Continued)

(56) References Cited

U.S. PATENT DOCUMENTS

| | | | | |
|---|---|---|---|---|
| 5,432,417 A | * | 7/1995 | Takenaka | ............. B62D 57/032 |
| | | | | 318/568.22 |
| 5,808,433 A | * | 9/1998 | Tagami | ................ B62D 57/032 |
| | | | | 901/1 |

(Continued)

FOREIGN PATENT DOCUMENTS

| CN | 109625118 A | 4/2019 |
|---|---|---|
| CN | 109987169 A | 7/2019 |

*Primary Examiner* — Khoi H Tran
*Assistant Examiner* — Nhi Q Bui

(57) ABSTRACT

The present disclosure provides a foot-waist coordinated gait planning method and an apparatus and a robot using the same. The method includes: obtaining an orientation of each foot of the legged robot, and calculating a positional compensation amount of each ankle of the legged robot based on the orientation of the foot; obtaining an orientation of a waist of the legged robot, and calculating a positional compensation amount of each hip of the legged robot based on the orientation of the waist; calculating a hip-ankle positional vector of the legged robot; compensating the hip-ankle positional vector based on the positional compensation amount of the ankle and the positional compensation amount of the hip to obtain the compensated hip-ankle positional vector; and performing an inverse kinematics analysis on the compensated hip-ankle positional vector to obtain joint angles of the legged robot.

18 Claims, 11 Drawing Sheets

(58) Field of Classification Search
CPC ... B25J 9/161; B25J 9/16; B25J 9/1674; B25J 9/1607; B25J 9/1694; B25J 9/0006; B25J 9/1641; B25J 9/023; B25J 9/003; B25J 9/0036; B25J 9/0057; B25J 17/00; B25J 17/0275; B25J 13/04; B62D 57/032; G05B 13/042; G05B 19/42; G05B 19/4083; G05B 2219/39343; G05B 2219/39194; G05B 2219/40599; G05B 2219/40371; G05B 2219/40527; G05B 2219/39215; G05B 2219/40517; G05B 2219/39201; G05B 2219/40331; G05B 2219/39183; G05B 2219/39347; G06N 3/08
See application file for complete search history.

(56) References Cited

U.S. PATENT DOCUMENTS

| | | | | |
|---|---|---|---|---|
| 8,301,303 | B2* | 10/2012 | Kwak | B62D 57/032 700/245 |
| 9,073,209 | B2* | 7/2015 | Lee | B62D 57/032 |
| 2006/0195223 | A1* | 8/2006 | Kawai | B62D 57/032 700/245 |
| 2007/0145930 | A1* | 6/2007 | Zaier | B62D 57/032 318/568.12 |
| 2007/0267994 | A1* | 11/2007 | Sugihara | B62D 57/032 901/1 |
| 2008/0258669 | A1* | 10/2008 | Fukuda | B62D 57/032 901/1 |
| 2015/0202768 | A1* | 7/2015 | Moridaira | B62D 57/032 901/1 |

* cited by examiner

FOOT-WAIST COORDINATED GAIT PLANNING METHOD AND APPARATUS AND ROBOT USING THE SAME

CROSS REFERENCE TO RELATED APPLICATIONS

The present disclosure claims priority to Chinese Patent Application No. 201911188547.8, filed Nov. 28, 2019, which is hereby incorporated by reference herein as if set forth in its entirety.

BACKGROUND

1. Technical Field

The present disclosure relates to robot technology, and particularly to a foot-waist coordinated gait planning method as well as an apparatus and a robot using the same.

2. Description of Related Art

Legged robots can not only walk on flat grounds, but also walk in complex environments, for example, climbing up and down steps/slopes, crossing obstacles, and moving on uneven grounds. Typical walking gait is to fit robot feet to the ground (without considering the effect of the orientation of the feet when contacting the ground), then perform an inverse kinematics calculation to convert the planned movement trajectory into the desired joint angle, so as to realize trajectory tracking by driving the servo of the joint. This method fails to fully consider the postural changes of the foot and the waist, and cannot effectively coordinate the foot and the waist, which has low accuracy and is difficult to perform complex motions such as dance and motion imitations.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" or ("comprising") indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third" and the like in the descriptions are only used for distinguishing, and cannot be understood as indicating or implying relative importance.

Figure 1:
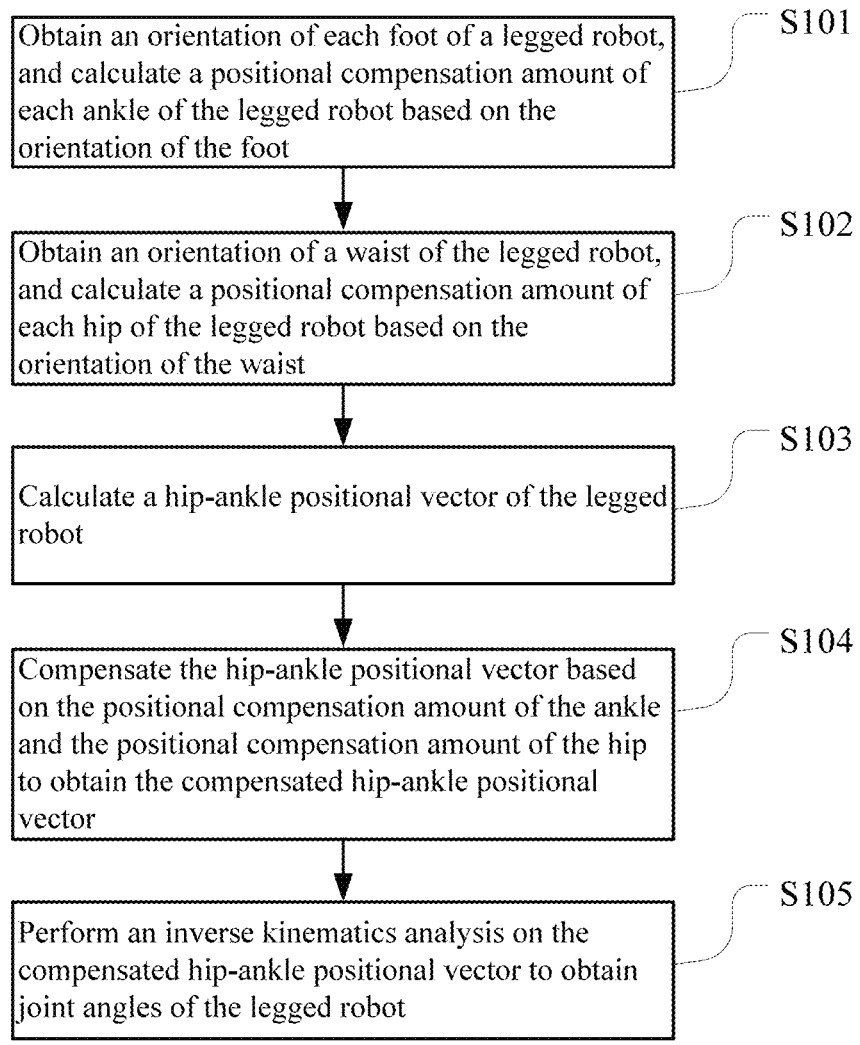
FIG. 1 is a flow chart of an embodiment of a foot-waist coordinated gait planning method for a legged robot according to the present disclosure.

FIG. 1 is a flow chart of an embodiment of a foot-waist coordinated gait planning method for a legged robot according to the present disclosure. In this embodiment, a foot-waist coordinated gait planning method for a legged robot is provided. Please refer to FIG. 7, the legged robot has two legs each having a foot 200, an ankle A, a knee K, a waist T, and a hip H. Each of the ankle A, the knee K and the hip H is a joint, where each joint includes at least one servo, for example, the knee K includes one servo, the ankle A includes two servos, and the hip H includes three servos. The legged robot can be a humanoid/biped robot or a four-leg robot. For simplicity, only a right leg is described hereinafter. The method is a computer-implemented method executable for a processor. In one embodiment, the method may be implemented through and applied to a foot-waist coordinated gait planning apparatus shown in FIG. 10 or implemented through and applied to a robot shown in FIG. 11. As shown in FIG. 1, the method includes the following steps.

S101: obtaining an orientation of each foot 200 of the legged robot, and calculating a positional compensation amount of each ankle A of the legged robot based on the orientation of the foot 200.

In which, the orientation of each of the feet of the robot can be denoted as (roll, pitch, yaw), where roll is the roll angle of the orientation of the foot, pitch is the pitch angle of the orientation of the foot, and yaw is the yaw angle of the orientation of the foot.

Figure 2:
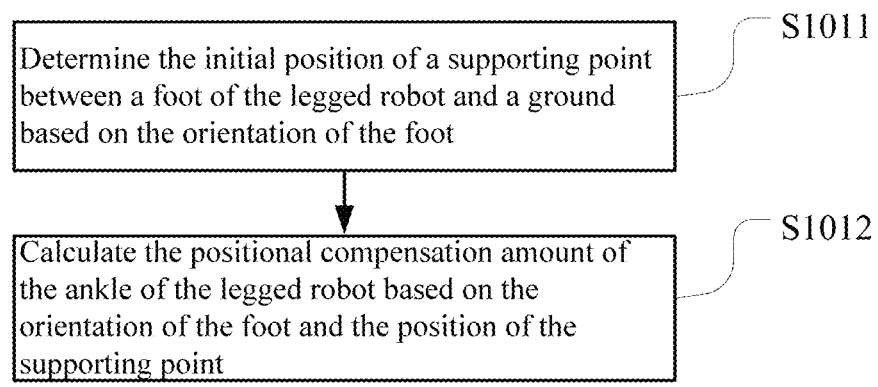
FIG. 2 is a flow chart of an example of calculating the positional compensation amount of an ankle of a foot of the legged robot based on orientation of the foot in the method of FIG. 1.

FIG. 2 is a flow chart of an example of calculating the positional compensation amount of an ankle of a foot of the legged robot based on the orientation of the foot in the method of FIG. 1. As shown in FIG. 2, in one embodiment, the step of calculating the positional compensation amount of the ankle of the legged robot based on the orientation of the foot can include the following steps.

S1011: determining the initial position of a supporting point S between a foot 200 (see FIG. 7) of the legged robot and a ground based on the orientation of the foot.

Figure 3:
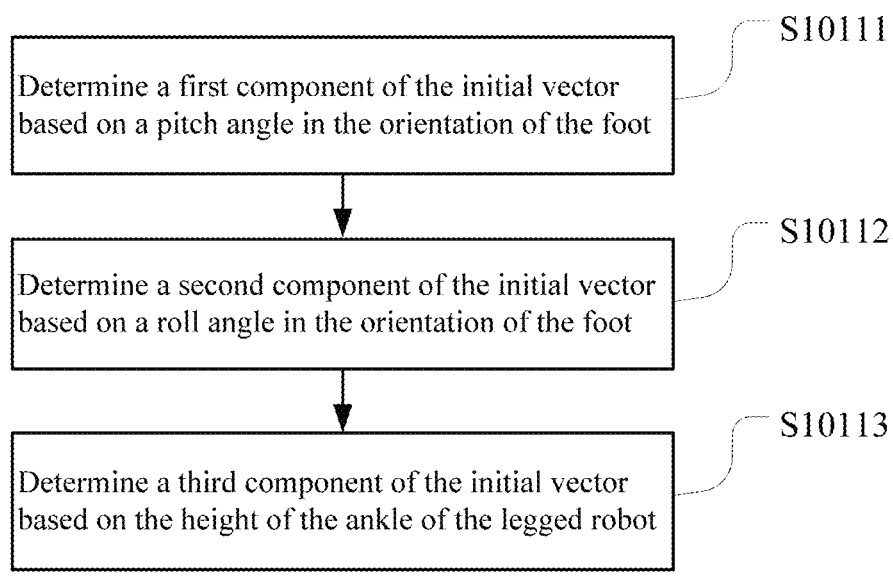
FIG. 3 is a flow chart of an example of determining the position of the supporting point between the foot of the legged robot and the ground based on the orientation of the foot in the method of FIG. 2.

In which, the initial position of the supporting point S (i.e., the lowest point of the foot with respect to the ankle) can be represented by an initial vector $\overrightarrow{AS}$ from the ankle A to the supporting point S, which is denoted as $(ll, dd, hh)^T$, where ll is the first component of the vector $\overrightarrow{AS}$, dd is the second component of the vector $\overrightarrow{AS}$, hh is the third component of the vector $\overrightarrow{AS}$, and T is the transpose operation. FIG. 3 is a flow chart of an example of determining the position of the supporting point between the foot of the legged robot and the ground based on the orientation of the foot in the method of FIG. 2. As shown in FIG. 3, in one embodiment, step S1011 can include the following steps.

S10111: determining a first component of the initial vector $\overrightarrow{AS}$ based on a pitch angle in the orientation of the foot.

Figure 4:
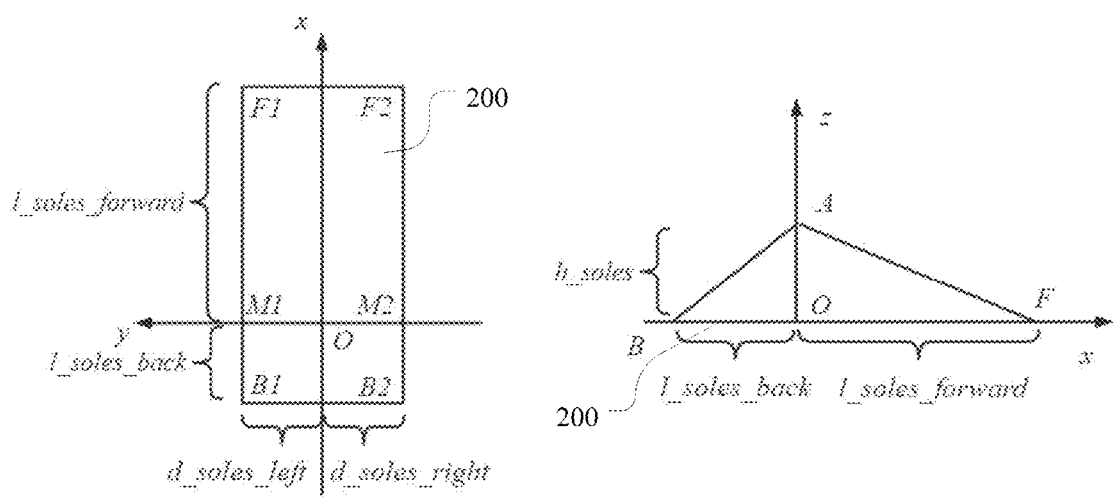
FIG. 4 is a schematic diagram of the determination of the position of the supporting point between the foot of the legged robot and the ground based on the orientation of the foot according to the embodiment of FIG. 3.

FIG. 4 is a schematic diagram of the determination of the position of the supporting point between the foot of the legged robot and the ground based on the orientation of the foot according to the embodiment of FIG. 3. As shown in FIG. 4, the left part is the top view of the foot, and the right part is the side view of the foot.

If pitch>0, it represents the case of supporting through the toe (i.e., supporting through the F1F2 side shown in FIG. 4) of the foot. In this case, ll=l_soles_forward, where l_soles_forward is the length of the projection OF (point O is the original point of the coordinate system) from the ankle A to the toe on the foot 200.

If pitch=0, it represents the case of supporting through the bottom surface (i.e., the sole) of the foot (i.e., supporting through the M1M2 side shown in FIG. 4) of the foot. In this case, ll=0.

If pitch<0, it represents the case of supporting through the heel (i.e., supporting through the B1B2 side shown in FIG. 4) of the foot. In this case, ll=−l_soles_back, where l_soles_back is the length of the projection OB from the ankle A to the heel on the foot 200.

S10112: determining a second component of the initial vector AS based on a roll angle in the orientation of the foot.

If roll>0, it represents the case of supporting through the right side of the foot (i.e., supporting through the F2B2 side shown in FIG. 4). In this case, dd=−d_soles_right, where d_soles_right is the projected length from the ankle A to the right side of the foot.

If roll=0, it represents the case of supporting through the bottom surface (i.e., the sole) of the foot (i.e., supporting through the x-axis support shown in FIG. 4). In this case, dd=0.

If roll<0, it represents the case of supporting through the left side of the foot (i.e., supporting through the F1B1 side shown in FIG. 4). In this case, dd=d_soles_left, where d_soles_left is the projected length from the ankle A to the left side of the foot.

S10113: determining a third component of the initial vector based on the height AO of the ankle A of the legged robot.

That is, hh=−h_soles, where h_soles is the height AO of the ankle A.

S1012: calculating the positional compensation amount of the ankle of the legged robot based on the orientation of the foot and the position of the supporting point S.

Figure 5:
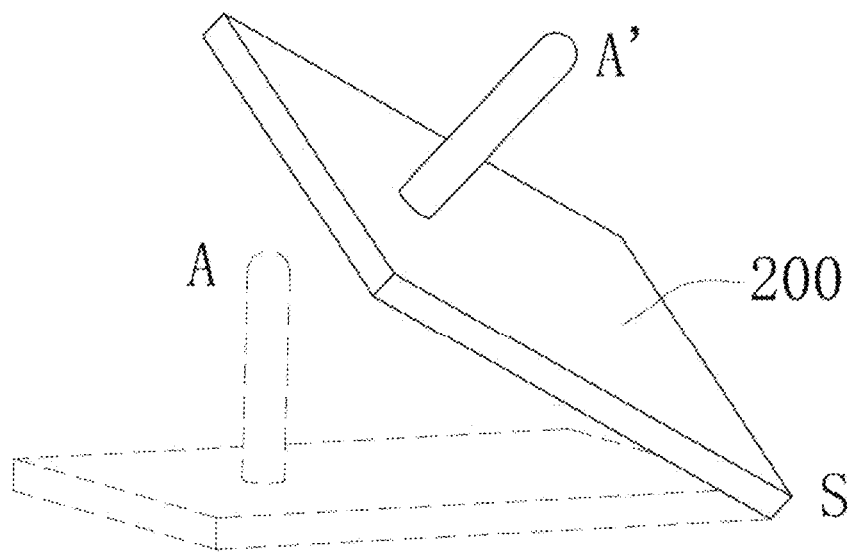
FIG. 5 is a schematic diagram of an example of the change in the position of the ankle of the robot according to an embodiment of the present disclosure.
Figure 6:
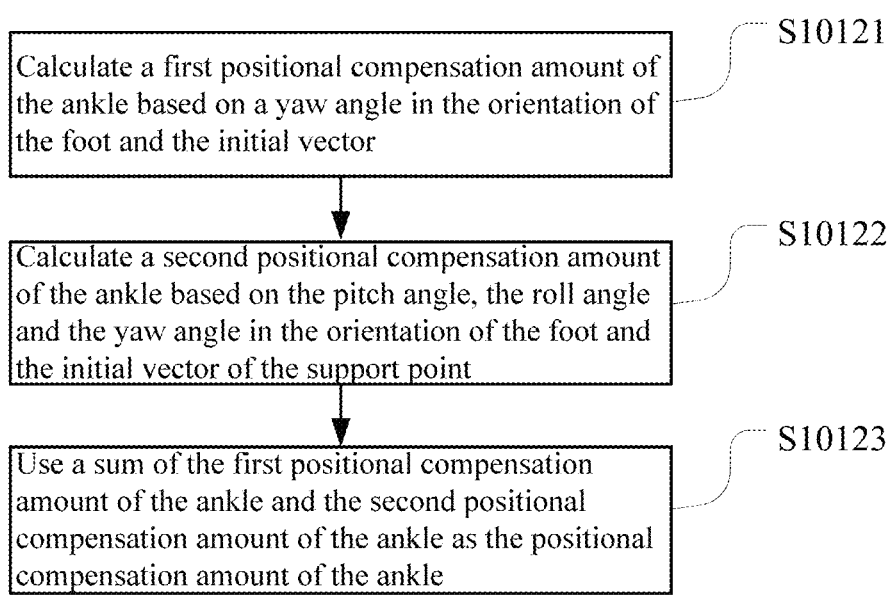
FIG. 6 is a flow chart of an example of calculating the positional compensation amount of the ankle of the legged robot based on the orientation of the foot and the position of the supporting point according to an embodiment of the present disclosure.

FIG. 5 is a schematic diagram of an example of the change in the position of the ankle of the robot according to an embodiment of the present disclosure. As shown in FIG. 5, in the case that the orientation of the foot does not change, the original position of the ankle is A; in the case that the orientation of the foot changes, the position A of the ankle will rotate around the sole supporting point S to the new position A'. Calculating the change of the position of the ankle caused by changing the foot positional angle (that is, the positional compensation amount of the ankle) is equivalent to calculating the vector $\overrightarrow{AA'}$. Furthermore, it can be decomposed into two parts, that is, the positional vector $\overrightarrow{AS}$ of the sole supporting point S in the ankle coordinate system (i.e., the first positional compensation amount of the position of the ankle) and the positional vector $\overrightarrow{SA'}$ of the new position A' of the ankle in the ankle coordinate system (i.e., the second compensation amount of the position of the ankle). FIG. 6 is a flow chart of an example of calculating the positional compensation amount of the ankle of the legged robot based on the orientation of the foot and the position of the supporting point according to an embodiment of the present disclosure. As shown in FIG. 6, in one embodiment, step S1012 can include the following steps.

S10121: calculating a first positional compensation amount of the ankle based on a yaw angle in the orientation of the foot and the initial vector $\overrightarrow{AS}$.

In which, the first positional compensation amount of the ankle after rotated can be calculated based on the formula of:

$$\overrightarrow{AS} = R_z(yaw) \cdot (ll, dd, hh)^T;$$

where, $R_z(yaw)$ is the first rotation matrix, and $$R_z(yaw) = \begin{bmatrix} \cos(yaw) & -\sin(yaw) & 0 \\ \sin(yaw) & \cos(yaw) & 0 \\ 0 & 0 & 1 \end{bmatrix}.$$

S10122: calculating a second positional compensation amount of the ankle based on the pitch angle, the roll angle and the yaw angle in the orientation of the foot 200 and the initial vector of the support point S.

In which, the second compensation amount of the position of the ankle can be calculated based on the formula of:

$$SA'=R_z(yaw)R_y(pitch)R_x(roll) \cdot (-ll,-dd,-hh)^T;$$

where, $R_y$(pitch) is the second rotation matrix and $$R_y(pitch) = \begin{bmatrix} \cos(pitch) & 0 & \sin(pitch) \\ 0 & 1 & 0 \\ -\sin(pitch) & 0 & \cos(pitch) \end{bmatrix}, R_x(roll)$$

$$R_x(roll) = \begin{bmatrix} 1 & 0 & 0 \\ 0 & \cos(roll) & -\sin(roll) \\ 0 & \sin(roll) & \cos(roll) \end{bmatrix}.$$

is the third rotation matrix, and $$R_x(roll) = \begin{bmatrix} 1 & 0 & 0 \\ 0 & \cos(roll) & -\sin(roll) \\ 0 & \sin(roll) & \cos(roll) \end{bmatrix}.$$

S10123: using a sum of the first positional compensation amount of the ankle and the second positional compensation amount of the ankle as the positional compensation amount (i.e., $\vec{AA'}=\vec{AS}+\vec{SA'}$) of the ankle.

The positional compensation amount of the ankle is denoted as d_ankle, then:

$$d\_ankle = R_z(yaw) \cdot (ll,dd,hh)^T + R_z(yaw)R_y(pitch)R_x(roll) \cdot (-ll,-dd,-hh)^T.$$

S102: obtaining an orientation of the waist T of the legged robot, and calculating a positional compensation amount of each hip H of the legged robot based on the orientation of the waist T.

Figure 7:
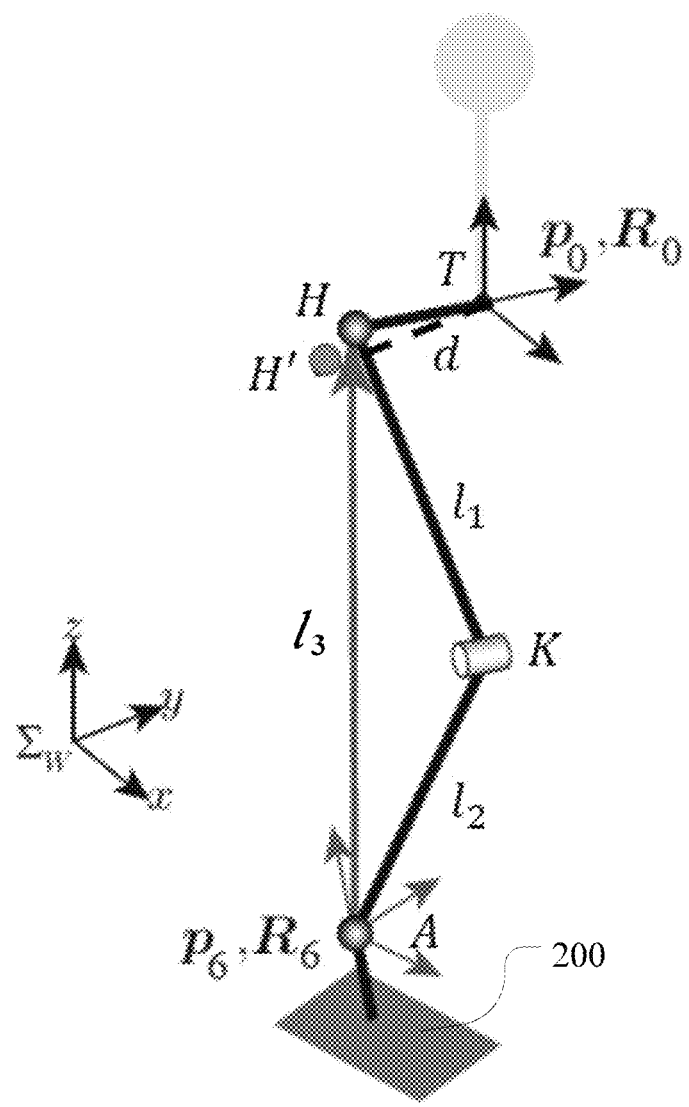
FIG. 7 is a schematic diagram of the calculation of the positional compensation amount of the hip according to an embodiment of the present disclosure.

As shown in FIG. 7, point T denotes the waist of the robot, the position of point T is $p_0$, and the posture of point T is $R_0$; point A denotes the ankle, the position of point A is $p_6$, and the posture of point A is $R_6$; in which, the above-mentioned positions and the postures are with respect to a world coordinate system. Point H denotes the hip, which can a ball joint composed of three rotational joints. The distance between point H and point T is d, and the position of point H is $p_1$, then $p_1=p_0+(0, d, 0)^T$.

As the posture of point T changes, the link HT will rotate accordingly, which causes the position of the hip be changed from point H to point H', that is, the new position of the hip. The change between H and H', that is, the positional compensation amount of the hip is:

$$d_{hip}=(R_0-I) \cdot (0,d,0)^T;$$

where, I is the first orientation, that is, the orientation of the waist of the robot in the world coordinate system (denoted as $\Sigma_w$), and $R_0$ is the second orientation, that is, the orientation of the waist of the robot in the waist coordinate system (denoted as $\Sigma_0$).

S103: calculating a hip-ankle positional vector of the legged robot.

The hip-ankle positional vector is a positional vector from the hip to the ankle of each foot. The hip-ankle positional vector can be calculated based on the formula of:

$$p\_hip2ankle\_old=p_6-p_1;$$

where, p_hip2ankle_old is the hip-ankle positional vector, $p_6$ is the position of the ankle, $p_1$ is the position of the hip and $p_1=p_0+(0, d, 0)^T$ and $p_0$ is the position of the waist.

S104: compensating the hip-ankle positional vector based on the positional compensation amount of the ankle A and the positional compensation amount of the hip H to obtain the compensated hip-ankle positional vector.

In which, the compensated hip-ankle positional vector can be calculated based on the formula of:

$$p\_hip2ankle\_new=p\_hip2ankle\_old+d\_ankle-d\_hip:$$

where, p_hip2ankle_old is the hip-ankle positional vector, d_ankle is the positional compensation amount of the ankle, d_hip is the positional compensation amount of the hip, and p_hip2ankle_new is the compensated hip-ankle positional vector.

S105: performing an inverse kinematics analysis on the compensated hip-ankle positional vector to obtain joint angles of the legged robot.

First, the hip positional vector in the ankle coordinate system can be calculated based on the compensated hip-ankle positional vector and the orientation of the foot 200.

In which, the hip positional vector can be calculated based on the formula of:

$$r=(R_6^T(-p\_hip2ankle\_new);$$

where, $r=(r_x, r_y, r_z)^T$ and $r_x, r_y, r_z$ are three components of the hip positional vector, and $R_6$ is the orientation of the foot 200.

Then, the inverse kinematics analysis is performed on the hip positional vector to obtain the joint angles of the legged robot.

The distance between the hip and the ankle is denoted as $l_3$, then:

$$l_3=\|r\|=\sqrt{r_x^2+r_y^2+r_z^2}.$$

Figure 8:
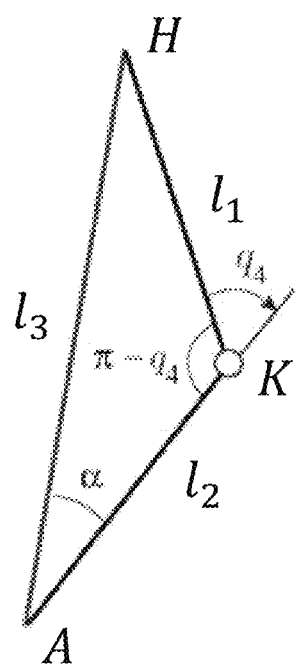
FIG. 8 is a schematic diagram of the calculation of the knee pitch angle according to an embodiment of the present disclosure.

As shown in FIG. 8, in the triangle HKA, the knee pitch angle can be calculated based on the cosine theorem, that is:

$$q_4 = -\arccos\left(\frac{l_2^2+l_s^2-l_s^2}{2l_1l_3}\right) + \pi;$$

where, $l_1$ is the length of the thigh, and $l_2$ is the length of the shank; the shank angle in the triangle HKA is denoted as $\alpha$, then:

$$\alpha = \arccos\left(\frac{l_2^2+l_3^2-l_1^2}{2l_2l_3}\right).$$

Figure 9:
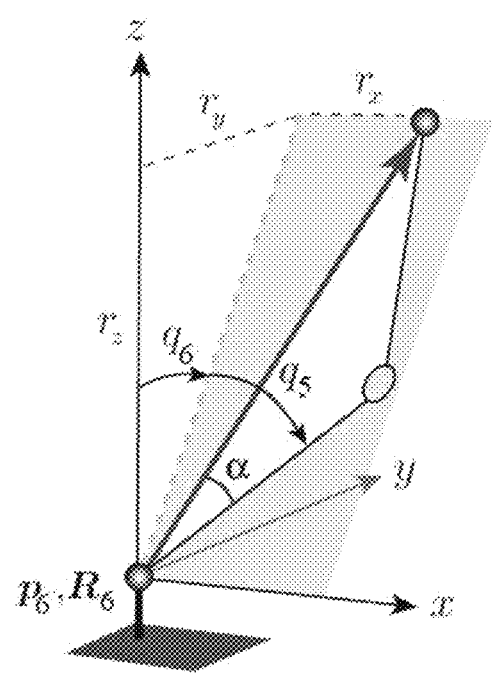
FIG. 9 is a schematic diagram of the calculation of the ankle roll joint angle and the ankle pitch joint angle according to an embodiment of the present disclosure.

As shown in FIG. 9, in the ankle coordinate system, the ankle roll angle $q_6$ and the ankle pitch angle $q_5$ can be obtained based on the vector as follows:

$$q_6=a\tan 2(r_y,r_z); \text{ and}$$

$$q_5=-a\tan 2(r_x,\text{sign}(r_z)\sqrt{r_y^2+r_z^2})-\alpha;$$

Based on the chain law, the relationship between the postures of each link is:

$$R_6=R_0R_x(q_1)R_x(q_2)R_y(q_5)R_y(q_4+q_5)R_x(q_6).$$

The above-mentioned formula can be deformed to obtain:

$$R_z=(q_1)R_x(q_2)R_y(q_3)=R_0^T R_6 R_x(-q_6)R_y(-q_4-q_5).$$

The above-mentioned formula can be expanded to obtain:

$$\begin{bmatrix} c_1c_3 - s_1s_2s_3 & -s_1c_2 & c_1s_3 + s_1s_2c_3 \\ s_1c_3 + c_1s_2s_3 & c_1c_2 & s_1s_3 - c_1s_2c_3 \\ -c_2s_3 & s_2 & c_2c_3 \end{bmatrix} = \begin{bmatrix} R_{11} & R_{12} & R_{13} \\ R_{21} & R_{22} & R_{23} \\ R_{31} & R_{32} & R_{33} \end{bmatrix};$$

where, $C_i = \cos q_i$, $s_i = \sin q_i$, $i \in \{1,2,3\}$.

Based on the above-mentioned formula, the hip yaw angle $q_1$, the hip roll angle $q_2$, and the hip pitch angle $q_3$ can be obtained as follows:

$$q_1 = a\tan 2(-R_{12}, R_{22});$$

$$q_2 = a\tan 2(R_{32}, \sqrt{R_{12}^2 - R_{22}^2}); \text{ and}$$

Then, the process of the inverse kinematics analysis is completed, and each joint angle of the legged robot can be obtained.

In summary, in this embodiment, it obtains an orientation of each foot of the legged robot, and calculates a positional compensation amount of each ankle of the legged robot based on the orientation of the foot; obtains an orientation of a waist of the legged robot, and calculates a positional compensation amount of each hip of the legged robot based on the orientation of the waist; calculates a hip-ankle positional vector of the legged robot, where the hip-ankle positional vector is a positional vector from the hip to the ankle; compensates the hip-ankle positional vector based on the positional compensation amount of the ankle and the positional compensation amount of the hip to obtain the compensated hip-ankle positional vector; and performs an inverse kinematics analysis on the compensated hip-ankle positional vector to obtain joint angles of the legged robot. Through this embodiment, on the basis of the prior art, the changes of the orientation of the foot and the orientation of the waist are also taken into consideration, and the positions of the ankle and the hip (that is, the hip-ankle positional vector) are compensated to perform inverse kinematics analysis, which can realize effective foot-waist coordination and improve the accuracy of the movement, so as to complete various complex movements.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 10:
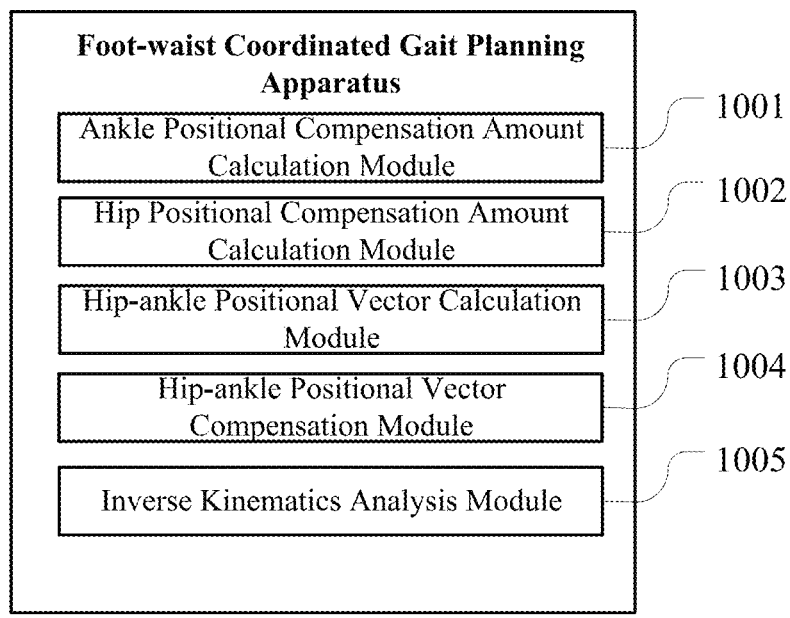
FIG. 10 is a schematic block diagram of an embodiment of a foot-waist coordinated gait planning apparatus according to the present disclosure.

FIG. 10 is a schematic block diagram of an embodiment of a foot-waist coordinated gait planning apparatus according to the present disclosure. Corresponding to the foot-waist coordinated gait planning method described in the above-mentioned embodiment, a foot-waist coordinated gait planning apparatus for a legged robot is provided. In which, the legged robot has two legs each having a foot with an ankle, a waist, and a hip. Each of the foot the ankle, the waist and the hip has at least a joint, where each joint includes a servo. In one embodiment, the apparatus may be a robot shown in FIG. 11. In this embodiment, the foot-waist coordinated gait planning apparatus can include:

an ankle positional compensation amount calculation module 1001 configured to obtain an orientation of each foot of the legged robot, and calculating a positional compensation amount of each ankle of the legged robot based on the orientation of the foot;

a hip positional compensation amount calculation module 1002 configured to obtain an orientation of a waist of the legged robot, and calculating a positional compensation amount of each hip of the legged robot based on the orientation of the waist;

a hip-ankle positional vector calculation module 1003 configured to calculate a hip-ankle positional vector of the legged robot, where the hip-ankle positional vector is a positional vector from the hip to the ankle;

a hip-ankle positional vector compensation module 1004 configured to compensating the hip-ankle positional vector based on the positional compensation amount of the ankle and the positional compensation amount of the hip to obtain the compensated hip-ankle positional vector; and an inverse kinematics analysis module 1005 configured to perform an inverse kinematics analysis on the compensated hip-ankle positional vector to obtain joint angles of the legged robot.

Furthermore, the ankle positional compensation amount calculation module 1001 can include:

a supporting point determining submodule configured to determine the initial position of a supporting point between the foot of the legged robot and a ground based on the orientation of the foot; and an ankle positional compensation amount calculation submodule configured to calculate the positional compensation amount of the ankle of the legged robot based on the orientation of the foot and the position of the supporting point.

Furthermore, the supporting point determination submodule can include:

a first component determining unit configured to determine a first component of the initial vector based on a pitch angle in the orientation of the foot, where the initial vector is a vector from an ankle of the legged robot to the position of the supporting point;

a second component determining unit configured to determine a second component of the initial vector based on a roll angle in the orientation of the foot; and a third component determining unit configured to determine a third component of the initial vector based on the height of the ankle of the legged robot.

Furthermore, the ankle positional compensation amount calculation submodule can include:

a first compensation amount calculation unit configured to calculate a first positional compensation amount of the ankle based on a yaw angle in the orientation of the foot and the initial vector;

a second compensation amount calculation unit configured to calculate a second positional compensation amount of the ankle based on the pitch angle, the roll angle and the yaw angle in the orientation of the foot and the initial vector; and an ankle positional compensation amount calculation unit configured to use a sum of the first positional compensation amount of the ankle and the second positional compensation amount of the ankle as the positional compensation amount of the ankle.

Furthermore, the hip positional compensation amount calculation module 1002 can include:

a parameter obtaining submodule configured to obtain a first orientation, a second orientation, and a hip distance, where the first orientation is an orientation of the waist of the legged robot in a world coordinate system, the second orientation is an orientation of the waist of the legged robot in a waist coordinate system, and the hip distance is a distance from an origin of the waist coordinate system to the hip; and a hip positional compensation amount calculation submodule configured to calculate the positional compensation amount of the hip of the legged robot based on the first orientation, the second orientation, and the hip distance.

Furthermore, the hip-ankle positional vector compensation module 1004 is configured to calculate the compensated hip-ankle positional vector based on the formula of:

$$p\_hip2ankle\_new = p\_hip2ankle\_old + d\_ankle - d\_hip;$$

where, p_hip2ankle_old is the hip-ankle positional vector, d_ankle is the positional compensation amount of the ankle, d_hip is the positional compensation amount of the hip, and p_hip2ankle_new is the compensated hip-ankle positional vector.

Furthermore, the inverse kinematics analysis module 1005 can include:

a hip positional vector calculation submodule configured to calculate a hip positional vector in a foot coordinate system based on the compensated hip-ankle positional vector and the orientation of the foot; and an inverse kinematics analysis submodule configured to perform the inverse kinematics analysis on the hip positional vector to obtain the joint angle of the legged robot.

In this embodiment, each of the above-mentioned modules/submodules/units is implemented in the form of software, which can be computer program(s) stored in a memory of the foot-waist coordinated gait planning apparatus and executable on a processor of the foot-waist coordinated gait planning apparatus. In other embodiments, each of the above-mentioned modules/submodules/units may be implemented in the form of hardware (e.g., a circuit of the foot-waist coordinated gait planning apparatus which is coupled to the processor of the foot-waist coordinated gait planning apparatus) or a combination of hardware and software (e.g., a circuit with a single chip microcomputer).

Figure 11:
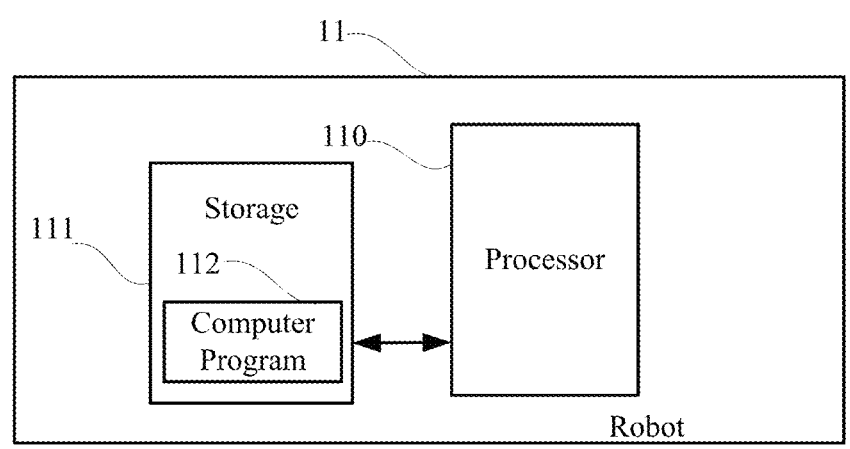
FIG. 11 is a schematic block diagram of an embodiment of a robot according to the present disclosure.

FIG. 11 is a schematic block diagram of an embodiment of a robot according to the present disclosure. For ease of description, only parts related to this embodiment are shown. In this embodiment, a robot 11 is provided. As shown in FIG. 11, in this embodiment, the robot 11 includes a processor 110, a storage 111, and a computer program 112 stored in the storage 111 and executable on the processor 110. When executing (instructions in) the computer program 112, the processor 110 implements the steps in the above-mentioned embodiments of the foot-waist coordinated gait planning method, for example, steps S101-S105 shown in FIG. 1. Alternatively, when the processor 110 executes the (instructions in) computer program 112, the functions of each module/unit in the above-mentioned device embodiments, for example, the functions of the modules 1001-1005 shown in FIG. 10 are implemented.

Exemplarily, the computer program 112 may be divided into one or more modules/units, and the one or more modules/units are stored in the storage 111 and executed by the processor 110 to realize the present disclosure. The one or more modules/units may be a series of computer program instruction sections capable of performing a specific function, and the instruction sections are for describing the execution process of the computer program 112 in the robot 11.

The robot 11 may include, but is not limited to, the processor 110 and the storage 111. It can be understood by those skilled in the art that FIG. 11 is merely an example of the robot 11 and does not constitute a limitation on the robot 11, and may include more or fewer components than those shown in the figure, or a combination of some components or different components. For example, the robot 11 may further include an input/output device, a network access device, a bus, and the like.

The processor 110 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 111 may be an internal storage unit of the robot 11, for example, a hard disk or a memory of the robot 11. The storage 111 may also be an external storage device of the robot 11, for example, a plug-in hard disk, a smart media card (SMC), a secure digital (SD) card, flash card, and the like, which is equipped on the robot 11. Furthermore, the storage 111 may further include both an internal storage unit and an external storage device, of the robot 11. The storage 111 is configured to store the computer program 112 and other programs and data required by the robot 11. The storage 111 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented foot-waist coordinated gait planning method, comprising:
   providing a legged robot comprising a processor;
   obtaining, by the processor, an orientation of each foot of the legged robot, and calculating a positional compensation amount of each ankle of each foot of the legged robot based on the orientation of the foot;
   obtaining, by the processor, an orientation of a waist of the legged robot, and calculating, by the processor, a positional compensation amount of each hip of the legged robot based on the orientation of the waist;
   calculating, by the processor, a hip-ankle positional vector of the legged robot, wherein the hip-ankle positional vector is a positional vector from the hip to the ankle;
   compensating, by the processor, the hip-ankle positional vector based on the positional compensation amount of the ankle and the positional compensation amount of the hip to obtain the compensated hip-ankle positional vector; and
   performing, by the processor, an inverse kinematics analysis on the compensated hip-ankle positional vector to obtain joint angles of the legged robot, and controlling the legged robot to move according to the joint angles of the legged robot;
   wherein the step of performing, by the processor, the inverse kinematics analysis on the compensated hip-ankle positional vector to obtain the joint angles of the legged robot comprises:
   calculating, by the processor, a hip positional vector in a foot coordinate system based on the compensated hip-ankle positional vector and the orientation of the foot; and
   performing, by the processor, the inverse kinematics analysis on the hip positional vector to obtain the joint angles of the legged robot.

2. The method of claim 1, wherein the step of calculating, by the processor, the positional compensation amount of the ankle of the legged robot based on the orientation of the foot comprises:
   determining, by the processor, the initial position of a supporting point between the foot of the legged robot and a ground based on the orientation of the foot; and
   calculating, by the processor, the positional compensation amount of the ankle of the legged robot based on the orientation of the foot and the initial position of the supporting point.

3. The method of claim 2, wherein the step of determining, by the processor, the initial position of the supporting point between the sole of the foot of the legged robot and the ground based on the orientation of the foot comprises:
   determining, by the processor, a first component of an initial vector based on a pitch angle in the orientation of the foot, wherein the initial vector is a vector from an ankle of the legged robot to the initial position of the supporting point;
   determining, by the processor, a second component of the initial vector based on a roll angle in the orientation of the foot; and
   determining, by the processor, a third component of the initial vector based on the height of the ankle of the legged robot.

4. The method of claim 3, wherein the step of calculating, by the processor, the positional compensation amount of the ankle of the legged robot based on the orientation of the foot and the initial position of the supporting point comprises:
   calculating, by the processor, a first positional compensation amount of the ankle based on a yaw angle in the orientation of the foot and the initial vector;
   calculating, by the processor, a second positional compensation amount of the ankle based on the pitch angle, the roll angle and the yaw angle in the orientation of the foot and the initial vector; and using, by the processor, a sum of the first positional compensation amount of the ankle and the second positional compensation amount of the ankle as the positional compensation amount of the ankle.

5. The method of claim 1, wherein the step of obtaining, by the processor, the orientation of the waist of the legged robot, and calculating the positional compensation amount of the hip of the legged robot based on the orientation of the waist comprises:

obtaining, by the processor, a first orientation, a second orientation, and a hip distance, wherein the first orientation is an orientation of the waist of the legged robot in a world coordinate system, the second orientation is an orientation of the waist of the legged robot in a waist coordinate system, and the hip distance is a distance from an origin of the waist coordinate system to the hip; and calculating, by the processor, the positional compensation amount of the hip of the legged robot based on the first orientation, the second orientation, and the hip distance.

6. The method of claim 1, wherein the step of compensating, by the processor, the hip-ankle positional vector based on the positional compensation amount of the ankle and the positional compensation amount of the hip to obtain the compensated hip-ankle positional vector comprises:

calculating, by the processor the compensated hip-ankle positional vector based on the formula of:

$$p\_hip2ankle\_new = p\_hip2ankle\_old + d\_ankle - d\_hip;$$

where, p_hip2ankle_old is the hip-ankle positional vector, d_ankle is the positional compensation amount of the ankle, d_hip is the positional compensation amount of the hip, and p_hip2ankle_new is the compensated hip-ankle positional vector.

7. The method of claim 4, wherein the first positional compensation amount of the ankle after rotated is calculated based on the formula of:

$$\vec{AS} = R_z(yaw) * (ll, dd, hh)^T;$$

where, $R_z(yaw)$ is the first rotation matrix, and $$R_z(yaw) = \begin{bmatrix} \cos(yaw) & -\sin(yaw) & 0 \\ \sin(yaw) & \cos(yaw) & 0 \\ 0 & 0 & 1 \end{bmatrix};$$

$\vec{AS}$ is the first positional compensation amount of the ankle after rotated, $(ll, dd, hh)^T$ denotes the initial position of the supporting point, ll is the first component of the initial vector, dd is the second component of the initial vector, and hh is the third component of the initial vector.

8. The method of claim 7, wherein the second compensation amount of the position of the ankle is calculated based on the formula of:

$$\vec{SA'} = R_z(yaw) R_y(pitch) R_x(roll) * (-ll, -dd, -hh)T;$$

where, SA' is the second compensation amount of the position of the ankle, $R_y(pitch)$ is $$R_y(pitch) = \begin{bmatrix} \cos(pitch) & 0 & \sin(pitch) \\ 0 & 1 & 0 \\ -\sin(pitch) & 0 & \cos(pitch) \end{bmatrix}, R_x(roll)$$

the second rotation matrix and is the $$R_x(roll) = \begin{bmatrix} 1 & 0 & 0 \\ 0 & \cos(roll) & -\sin(roll) \\ 0 & \sin(roll) & \cos(roll) \end{bmatrix}.$$

third rotation matrix, and.

9. The method of claim 1, wherein the hip positional vector is calculated based on the formula of:

$$r = R_6^T(-p\_hip2ankle\_new);$$

where, r is the hip positional vector, and $r = (r_x, r_y, r_z)^T$ and $r_x, r_y$, and $r_z$ are three components of the hip positional vector, p_hip2ankle new is the compensated hip-ankle positional vector, and $R_6$ is the orientation of the foot.

10. A robot, comprising:
a memory;
a processor; and
one or more computer programs stored in the memory and executable on the processor, wherein the one or more computer programs comprise:
instructions for obtaining an orientation of each foot of the legged robot, and calculating a positional compensation amount of each ankle of each foot of the legged robot based on the orientation of the foot;
instructions for obtaining an orientation of a waist of the legged robot, and calculating a positional compensation amount of each hip of the legged robot based on the orientation of the waist;
instructions for calculating a hip-ankle positional vector of the legged robot, wherein the hip-ankle positional vector is a positional vector from the hip to the ankle;
instructions for compensating the hip-ankle positional vector based on the positional compensation amount of the ankle and the positional compensation amount of the hip to obtain the compensated hip-ankle positional vector; and
instructions for performing an inverse kinematics analysis on the compensated hip-ankle positional vector to obtain joint angles of the legged robot, and controlling the legged robot to move according to the joint angles of the legged robot;
wherein the instructions for obtaining the orientation of the waist of the legged robot, and calculating the positional compensation amount of the hip of the legged robot based on the orientation of the waist comprise:
instructions for obtaining a first orientation, a second orientation, and a hip distance, wherein the first orientation is an orientation of the waist of the legged robot in a world coordinate system, the second orientation is an orientation of the waist of the legged robot in a waist coordinate system, and the hip distance is a distance from an origin of the waist coordinate system to the hip; and
instructions for calculating the positional compensation amount of the hip of the legged robot based on the first orientation, the second orientation, and the hip distance.

11. The robot of claim 10, wherein the instructions for calculating the positional compensation amount of the ankle of the legged robot based on the orientation of the foot comprise:
  instructions for determining the initial position of a supporting point between the foot of the legged robot and a ground based on the orientation of the foot; and
  instructions for calculating the positional compensation amount of the ankle of the legged robot based on the orientation of the foot and the initial position of the supporting point.

12. The robot of claim 11, wherein the instructions for determining the initial position of the supporting point between the sole of the foot of the legged robot and the ground based on the orientation of the foot comprise:
  instructions for determining a first component of an initial vector based on a pitch angle in the orientation of the foot, wherein the initial vector is a vector from an ankle of the legged robot to the initial position of the supporting point;
  instructions for determining a second component of the initial vector based on a roll angle in the orientation of the foot; and
  instructions for determining a third component of the initial vector based on the height of the ankle of the legged robot.

13. The robot of claim 12, wherein the instructions for calculating the positional compensation amount of the ankle of the legged robot based on the orientation of the foot and the initial position of the supporting point comprise:
  instructions for calculating a first positional compensation amount of the ankle based on a yaw angle in the orientation of the foot and the initial vector;
  instructions for calculating a second positional compensation amount of the ankle based on the pitch angle, the roll angle and the yaw angle in the orientation of the foot and the initial vector; and
  instructions for using a sum of the first positional compensation amount of the ankle and the second positional compensation amount of the ankle as the positional compensation amount of the ankle.

14. The robot of claim 10, wherein the instructions for compensating the hip-ankle positional vector based on the positional compensation amount of the ankle and the positional compensation amount of the hip to obtain the compensated hip-ankle positional vector comprise:
  instructions for calculating the compensated hip-ankle positional vector based on the formula of:

$$p\_hip2ankle\_new = p\_hip2ankle\_old + d\_ankle - d\_hip;$$

where, p_hip2ankle_old is the hip-ankle positional vector, d_ankle is the positional compensation amount of the ankle, d_hip is the positional compensation amount of the hip, and p_hip2ankle_new is the compensated hip-ankle positional vector.

15. The robot of claim 10, wherein the instructions for performing the inverse kinematics analysis on the compensated hip-ankle positional vector to obtain the joint angles of the legged robot comprise:
  instructions for calculating a hip positional vector in a foot coordinate system based on the compensated hip-ankle positional vector and the orientation of the foot; and
  instructions for performing the inverse kinematics analysis on the hip positional vector to obtain the joint angles of the legged robot.

16. The robot of claim 13, wherein the first positional compensation amount of the ankle after rotated is calculated based on the formula of:

$$\vec{AS} = R_z(yaw) * (ll, dd, hh)^T;$$

where, $R_z(yaw)$ is the first rotation matrix, and $$R_z(yaw) = \begin{bmatrix} \cos(yaw) & -\sin(yaw) & 0 \\ \sin(yaw) & \cos(yaw) & 0 \\ 0 & 0 & 1 \end{bmatrix};$$

$\vec{AS}$ is the first positional compensation amount of the ankle after rotated, $(ll, dd, hh)^T$ denotes the initial position of the supporting point, ll is the first component of the initial vector, dd is the second component of the initial vector, and hh is the third component of the initial vector.

17. The robot of claim 16, wherein the second compensation amount of the position of the ankle is calculated based on the formula of:

$$\vec{SA'} = R_z(yaw) R_y(pitch) R_x(roll) * (-ll, -dd, -hh)^T;$$

where, SA' is the second compensation amount of the position of the ankle, $R_y(pitch)$ is $$R_y(pitch) = \begin{bmatrix} \cos(pitch) & 0 & \sin(pitch) \\ 0 & 1 & 0 \\ -\sin(pitch) & 0 & \cos(pitch) \end{bmatrix}, R_x(roll)$$

the second rotation matrix and is the $$R_x(roll) = \begin{bmatrix} 1 & 0 & 0 \\ 0 & \cos(roll) & -\sin(roll) \\ 0 & \sin(roll) & \cos(roll) \end{bmatrix}.$$

third rotation matrix, and.

18. The robot of claim 15, wherein the hip positional vector is calculated based on the formula of:

$$r = R_6^T(-p\_hip2ankle\_new);$$

where, r is the hip positional vector, and $r = (r_x, r_y, r_z)^T$ and $r_x, r_y,$ and $r_z$ are three components of the hip positional vector, p_hip2ankle new is the compensated hip-ankle positional vector, and $R_6$ is the orientation of the foot.

* * * * *